(12) United States Patent
Hirosawa et al.

(10) Patent No.: US 8,342,692 B2
(45) Date of Patent: *Jan. 1, 2013

(54) PROJECTOR WITH HEAT RADIATING CONSTRUCTION

(75) Inventors: Shigeru Hirosawa, Fussa (JP); Toshiyasu Tsubura, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/232,455

(22) Filed: Sep. 14, 2011

(65) Prior Publication Data

US 2012/0002176 A1    Jan. 5, 2012

Related U.S. Application Data

(63) Continuation of application No. 12/495,961, filed on Jul. 1, 2009, now Pat. No. 8,038,301.

(30) Foreign Application Priority Data

Jul. 4, 2008   (JP) .................................. 2008-175725

(51) Int. Cl.
*G03B 21/26* (2006.01)
*G03B 21/16* (2006.01)

(52) U.S. Cl. ................ 353/57; 353/52; 353/60; 353/61; 353/119

(58) Field of Classification Search .............. 353/57, 353/52, 60, 61, 119
See application file for complete search history.

(56) References Cited

U.S. PATENT DOCUMENTS 7,654,708 B2    2/2010   Nishikawa et al.
7,726,820 B2    6/2010   Hara et al.
7,753,532 B2    7/2010   Nasu et al.
7,845,803 B2    12/2010  Lv et al.
7,854,517 B2    12/2010  Tsubura
8,038,301 B2 *  10/2011  Hirosawa et al. ............... 353/57

(Continued)

FOREIGN PATENT DOCUMENTS

CN    101140405 A    3/2008

(Continued)

OTHER PUBLICATIONS

Japanese Office Action dated Apr. 22, 2010, issued in counterpart Japanese Application No. 2008-175725, and English translation thereof.

(Continued)

*Primary Examiner* — Georgia Y Epps
*Assistant Examiner* — Magda Cruz
(74) *Attorney, Agent, or Firm* — Holtz, Holtz, Goodman & Chick, PC (57) ABSTRACT

A projector includes a light source unit, a light source side optical system which includes a color wheel and a light guiding unit, a display device, a projection side optical system, a cooling fan, and a projector control unit. An interior of a projector casing is divided into an outlet side spatial compartment which is positioned on an outlet side of the cooling fan and in which the light source unit is disposed and an inlet side spatial compartment which is positioned on an inlet side of the cooling fan. The outlet side spatial compartment is covered thereabove by an upper division board, above which a heat conductive sheet which is formed of an aluminum sheet is disposed. The heat conductive sheet is electrically connected to the projector casing, so that electricity charged in the heat conductive sheet can be discharged.

13 Claims, 4 Drawing Sheets

U.S. PATENT DOCUMENTS

2008/0055562 A1* 3/2008 Zhang et al. .................. 353/61
2010/0045941 A1 2/2010 Chen

FOREIGN PATENT DOCUMENTS

| | | |
|---|---|---|
| JP | 2001-091926 A | 4/2001 |
| JP | 2004-264388 A | 9/2004 |
| JP | 2006-091697 A | 4/2006 |
| JP | 2006-098734 A | 4/2006 |
| JP | 2006-259027 A | 9/2006 |
| JP | 2006-330382 A | 12/2006 |
| JP | 2007-004103 A | 1/2007 |
| JP | 2007-114372 A | 5/2007 |
| JP | 2008-026723 A | 2/2008 |
| JP | 2008-026732 A | 2/2008 |
| JP | 2008-065327 A | 3/2008 |

OTHER PUBLICATIONS

Chinese Office Action dated Sep. 19, 2010, issued in counterpart Chinese Application No. 200910151370.4, and English translation thereof.

* cited by examiner

PROJECTOR WITH HEAT RADIATING CONSTRUCTION

CROSS-REFERENCE TO RELATED APPLICATIONS

This is a Continuation of U.S. application Ser. No. 12/495,961, filed Jul. 1, 2009 now U.S. Pat. No. 8,038,301, which application is based upon and claims the benefit of priority from prior Japanese Patent Application No. 2008-175725, filed Jul. 4, 2008, the entire contents of both of which are incorporated herein by reference.

BACKGROUND OF THE INVENTION

1. Field of the Invention

The present invention relates to a projector with a heat insulating construction for preventing the transmission of high heat to a casing of the projector and can disperse and radiate the high heat.

2. Description of the Related Art

In these days, a data projector is used in many cases for projecting images displayed on a screen of a personal computer, images based on video signals, and images based on image data stored in a memory card on to a screen.

This data projector employs a light source unit which includes a small and highly luminous discharge lamp such as a metal halide lamp or an extra-high pressure mercury lamp. Then, light emitted from the light source unit is modulated into light of three primary colors through color filters of a color wheel. Following this, the modulated light is shone on to a liquid crystal display device or a display device referred to as a DMD (Digital Micromirror Device) via a light source side optical system which includes a light guiding unit, and the light from the display device is then projected on to a screen via a projection side optical system which includes a zooming function.

In addition, the data projector described above incorporates a plurality of heat sources such as the light source unit, the light source side optical system, a power supply circuit, the display device and the like within a projector casing. Among them, the light source unit is heated to such a high temperature that exceeds 1000° C., and therefore, the heat of the light source unit so heated is conducted to the projector casing, leading to a problem that the temperature of the projector casing is increased.

Then, the Japanese Unexamined Patent Publication No. 2008-26732 proposes a projector in which an outlet side spatial compartment where a light source unit is disposed is defined within a substantially rectangular parallelepiped projector casing. In addition, cooling spaces are formed between an upper heat insulating casing which defines the outlet side spatial compartment and the light source unit and between the upper heat insulating casing and an upper panel of the projector casing to thereby prevent the transmission of heat from the light source unit to the upper panel. Additionally, in this proposal, it is also proposed to disperse heat that is conducted from the light source unit to the upper panel by affixing an aluminum sheet to the upper panel as a heat conductive sheet.

The light source unit used in the recent projector is made highly luminous, and when it is used, the highly luminous light source unit is heated to a high temperature. Therefore, heat from the light source unit so heated is conducted to the projector casing, which increases the temperature of the projector casing, having caused a problem that a particular portion of the upper panel which lies in the vicinity of the light source unit is locally heated to a high temperature. Then, as has been described above, the proposal has been made to prevent the direct transmission of heat from the light source unit to the projector casing by defining the space between the light source unit and the projector casing. Further, it has also been proposed to realize the dispersion of heat from the light source unit by affixing the heat conductive sheet to the projector casing. However, since the temperature of the light source unit is increased to such an extent that it exceeds 1000° C., it has not been able to prevent sufficiently the particularly local increase in temperature at the portion on the upper panel of the projector casing which lies directly above the light source unit.

In addition, in the case of a metallic sheet such as the aluminum sheet being used as the heat conductive sheet, due to the fact that the metallic sheet is charged in such a way as a capacitor is done, noise has been caused to be generated. Consequently, when the metallic sheet is used as the heat conductive sheet, the heat conductive sheet cannot be laid out to spread widely over the upper panel, having led to a problem that heat conducted to the upper panel cannot be dispersed sufficiently.

Consequently, a problem that is to be solved by the invention is to provide a projector with a heat insulating construction which can prevent the transmission of high heat of a light source unit to a projector casing thereof and which can disperse and radiate the high heat.

SUMMARY OF THE INVENTION

According to a preferred aspect of the invention, there is provided a projector having a light source unit, a light source compartment which stores the light source unit, a light source side optical system, a display device and a projection side optical system and including a projector control unit, wherein the light source compartment is covered thereabove by an upper division board above which a heat conductive sheet is disposed, and wherein the heat conductive sheet is electrically connected to a projector casing.

BRIEF DESCRIPTION OF THE DRAWINGS

The aforesaid object and further objects, features and advantages of the invention will become apparent further from the following detailed description as well as the accompanying drawings, in which.

DETAILED DESCRIPTION OF THE PREFERRED EMBODIMENT

Hereinafter, a best mode for carrying out the invention will be described by reference to the accompanying drawings. However, although an embodiment that will be described below involves various technical limitations which are preferred in carrying out the invention, the scope of invention is not at all limited to the following embodiment and illustrations made therein.

According to a best mode for carrying out the invention, there is provided a projector 10 which has a light source unit 63, a light source side optical system which includes a color wheel 68 and a light guiding unit 75, a display device 51, a projection side optical system 90, and a cooling fan or unit and includes a projector control unit, and an interior of a projector casing is divided into an outlet side spatial compartment which encompasses the light source unit and which is situated on an outlet side of the cooling unit and an inlet side spatial compartment which is situated on an inlet side of the cooling unit. In addition, the outlet side spatial compartment is covered thereabove by an upper division board above which a heat conductive sheet is disposed, and the heat conductive sheet is electrically connected to the projector casing so that charged electricity can be discharged.

In addition, a rigid resin board 127 is interposed between the upper division board 125 and the heat conductive sheet 128, and by being affixed to the resin board 127, the heat conductive sheet 128 is disposed above the upper division board 125.

Further, an air discharging space 126 is defined between the upper division board 125 and the resin board 127, and an opening is formed in the upper division board 125 so that discharged air is caused to flow into the air discharging space 126.

Additionally, the projector casing has a substantially rectangular parallelepiped shape, and a heat-resistant sheet 133 is disposed below an inner surface of an upper panel 11 of the projector casing and above the outlet side spatial compartment 122 via spacers 132, whereby a heat insulating space 134 is defined between the upper panel 11 and the heat-resistant sheet 133. In addition, the spacers 132 are formed of a heat-resistant pressure sensitive adhesive double coated tape.

In addition, a heat dissipating space 131 is defined between the heat conductive sheet 128 which is disposed above the upper division board 125 and a heat resistant sheet 133 which is disposed on the inner surface of the upper panel 11 of the projector casing.

Figure 1:
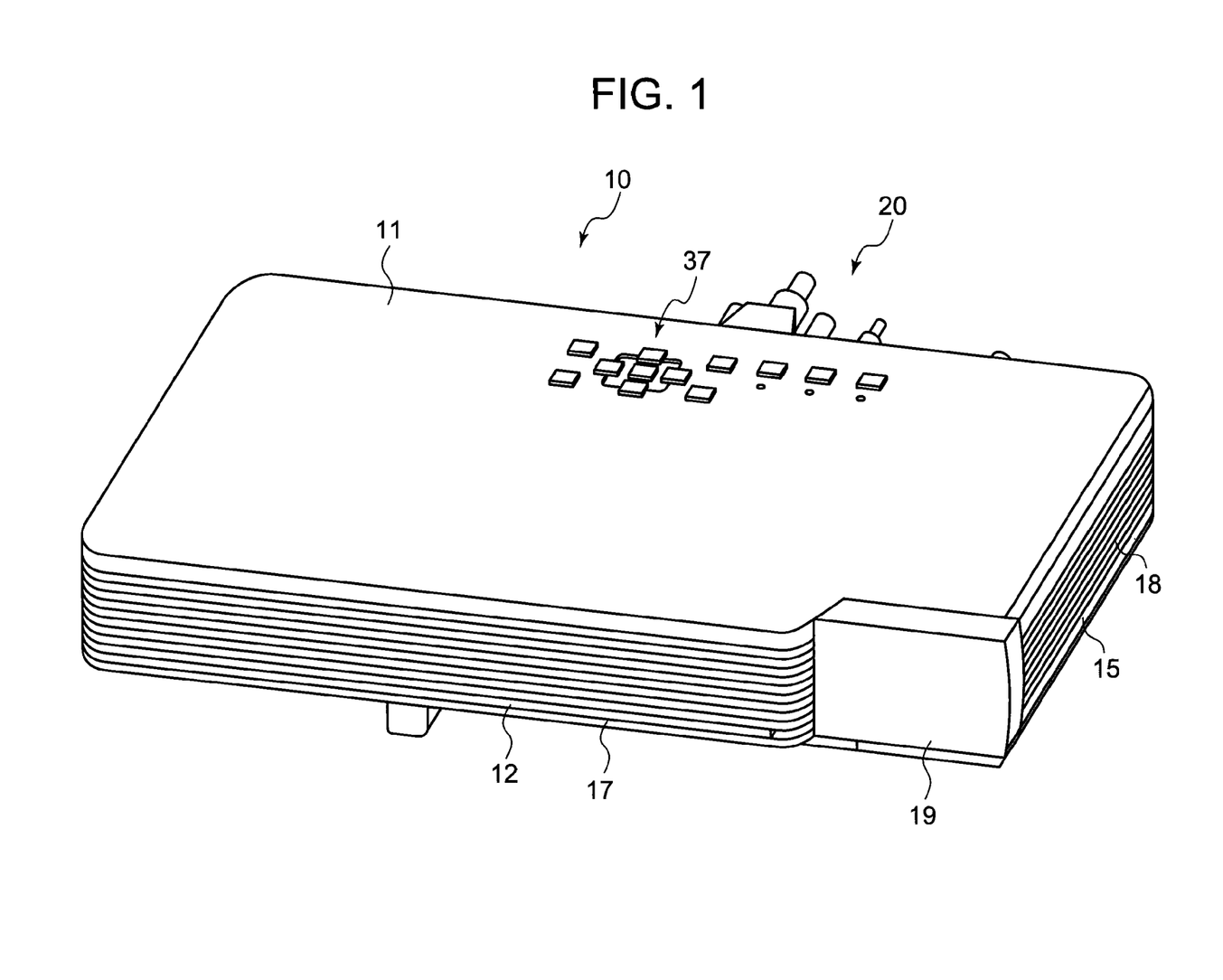
FIG. 1 is a perspective view showing an external appearance of a projector according to an embodiment of the invention.

Hereinafter, an embodiment of the invention will be described in detail. As is shown in FIG. 1, a projector 10 according to an embodiment of the invention has a substantially rectangular parallelepiped shape and has a lens cover 19 which covers a projecting aperture at a side of a front panel 12 which is a front side panel of the projector casing. A plurality of air outlet slits 17 are provided in the front panel 12. Further, although not shown, an Ir receiving part is provided on the front panel 12 to receive a control signal from a remote controller.

In addition, a key/indicator part 37 is provided on the upper panel 11 of the projector casing. In this key/indicator part 37, there are provided keys and indicators which include a power supply switch key, a power indicator which informs whether power supply is on or off, a projection switch key which switches on or off the projection of images, an overheat indicator which informs that a light source unit, a display device, a control circuit, or the like is overheating when these devices are put in such a condition.

Further, the projector 10 includes on a back panel 13, which is a side panel of the projector casing which is not shown, an input/output connector part where there are provided an USB terminal, an image signal input D-SUB terminal, an S terminal, an RCA terminal and the like, and various types of terminals 20 such as a power supply adaptor plug.

In addition, a plurality of inlet slits 18 are provided individually on a right-hand panel 14, which is a side panel of the projector casing which is not shown, and a left-hand panel 15, which is a side panel shown in FIG. 1.

Figure 2:
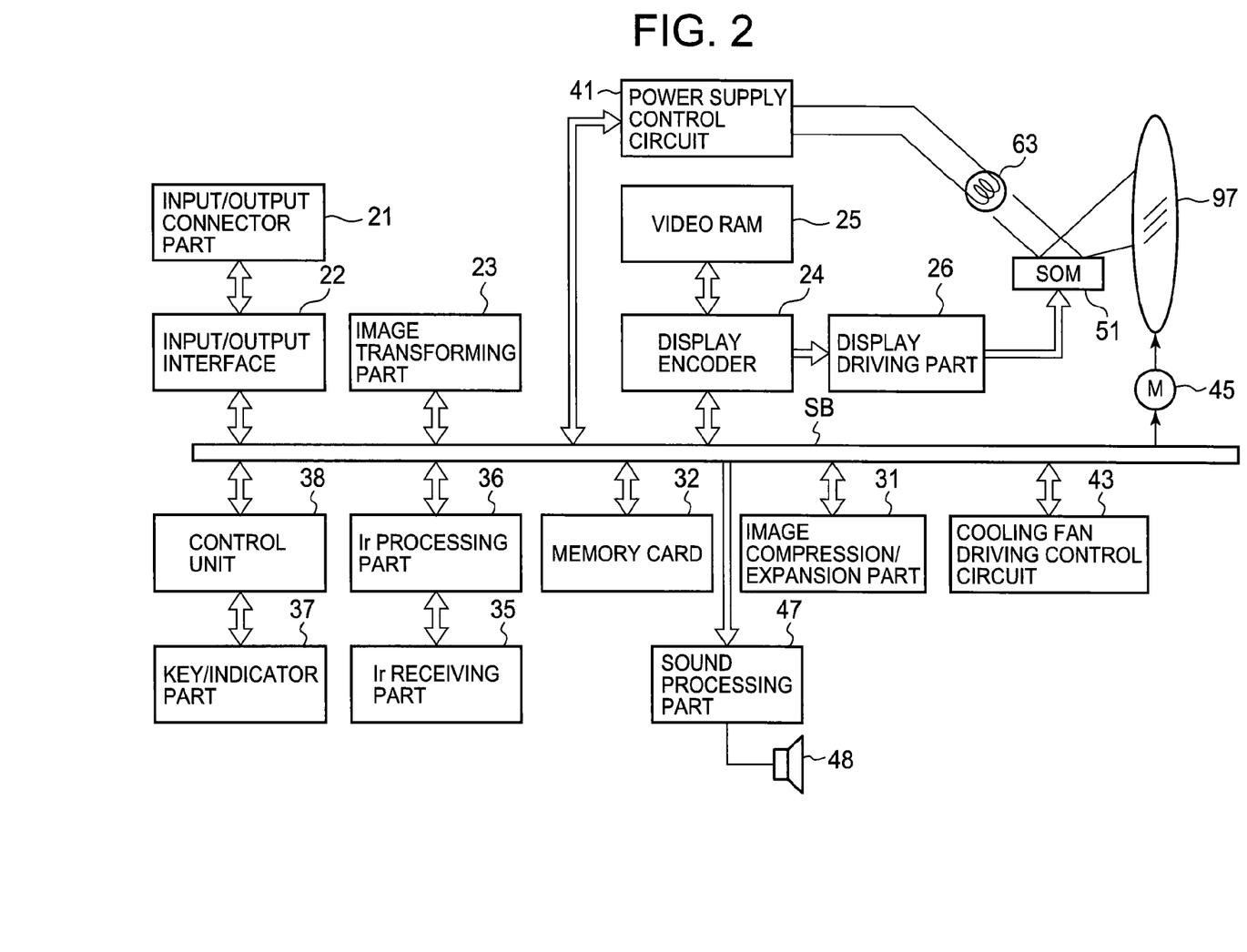
FIG. 2 is a block diagram showing functional circuit blocks of the projector according to the embodiment of the invention.

Additionally, as is shown in FIG. 2, the projector control unit of the projector 10 has a control unit 38, an input/output interface 22, an image transforming part 23, a display encoder 24, a display driving part 26 and the like. Image signals of various standards which are inputted from the input/output connector part 21 are sent via the input/output interface 22 and a system bus (SB) to the image transforming part 23 where the image signals are transformed so as to be united into an image signal of a predetermined format, and thereafter, the image signal so united is sent to the display encoder 24.

In addition, the display encoder 24 causes the image signal sent thereto to be deployed and stored in a video RAM 25 and thereafter generates a video signal from the contents stored in the video RAM 25 for output to the display driving part 26.

Additionally, the display driving part 26, into which the video signal is inputted from the display encoder 24, drives the display device 51, which is a spatial optical modulator (SOM), at an appropriate frame rate in response to the image signal sent thereto. The display device 51 reflects a pencil of light which is emitted from the light source unit 63 and is incident thereon via the light source side optical system so as to form an optical image for projection on to a screen, not shown, via projection system lens groups which configure the projection side optical system. In addition, a movable lens group 97 of the projection side optical system is driven by a lens motor 45 in zooming and focusing.

In addition, an image compression/expansion part 31 data compresses a luminance signal and a color-difference signal of the image signal through ADCT and Huffman coding operations. Then, a recording operation is performed in which the compressed data is written sequentially into a memory card 32 which is a detachable recording medium. In addition, in a reproduction mode, the image compression/expansion part 31 reads out the image data recorded in the memory card 32, expands individual image data which configure a series of dynamic images frame by frame and sends them to the display encoder 24 via the image transforming part 23, whereby the projector 10 can display dynamic images or the like based on the image data stored in the memory card 32.

In addition, the control unit 38 which governs the control of operations of respective circuits within the projector 10 is made up of a ROM which stores fixedly operation programs of a CPU and various settings, a RAM which is used as a work memory and the like.

Additionally, an operation signal of the key/indicator part 37 which is made up of the main keys and the indicators which are provided on the upper panel 11 of the projector casing is sent out directly to the control unit 38. In addition, a key operation signal from a remote controller is received at the Ir receiving part 35 and a code signal which is demodulated at an Ir processing part 36 is sent to the control unit 38.

Note that a sound processing part 47 which includes a sound source circuit such as a PCM sound source is connected to the control unit 38 via the system bus (SB). In projection mode and reproduction mode, sound data is transformed into analog signals, and a speaker 48 is driven to broadcast the sound loudly.

In addition, the control unit 38 controls a power supply control circuit 41 which illuminates a discharge lamp of the light source unit 63 when a lamp switch key is operated. In addition, the control unit 38 makes a cooling fan driving control circuit 43 implement a temperature detecting operation by a plurality of temperature sensors which are provided on the light source unit 63 and the like, so as to control the rotating speed of a cooling fan. Additionally, the control unit 38 makes the cooling fan continue to rotate even after the power supply to a projector main body has been switched off by the use of a timer or the like, and depending upon the result of the temperature detecting operation by the sensors, the control unit 38 also controls so that the power supply to the projector main body is switched off.

Figure 3:
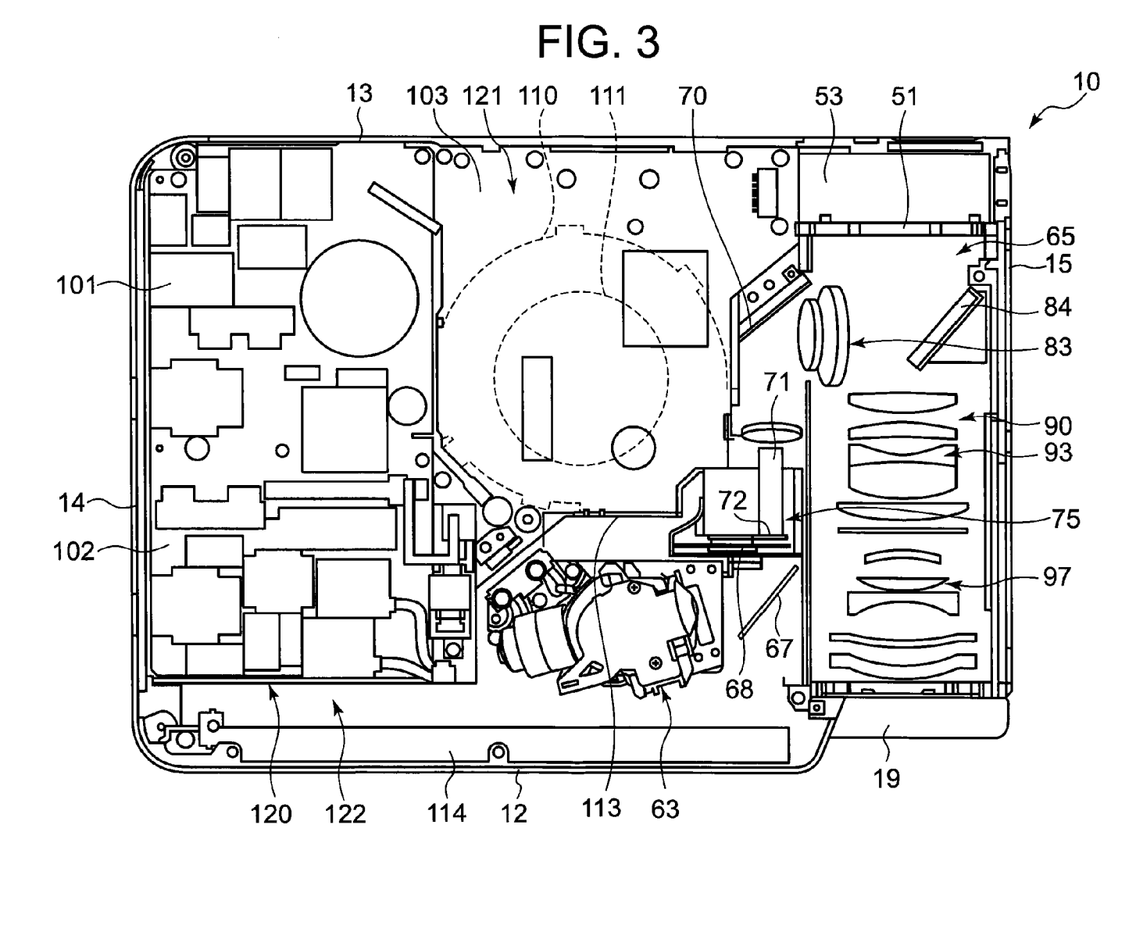
FIG. 3 is a plan view of the projector according to the embodiment of the invention with an upper panel removed therefrom.

As is shown in FIG. 3, these ROM, RAM, ICs and circuit devices are incorporated in a control circuit board 103, which is a main control board, and a power supply circuit block 101, so that the control circuit board 103 which is the main control board of the control system and a light source control circuit board 102 to which the power supply circuit block 101 of the power system and the like are attached are formed separately.

Additionally, as is shown in FIG. 3, in an interior construction of the projector 10, the light source control circuit board 102 to which the power supply circuit block 101 and the like are attached is disposed in the vicinity of the right-hand panel 14. In addition, an interior of the projector casing is divided into an inlet side spatial compartment 121 which lies on the back panel 13 side and an outlet side spatial compartment 122 which lies on the front panel 12 side in an airtight fashion by a division bulkhead 120. Further, a blower 110 of a sirocco fan type which configures the cooling fan is disposed in such a manner that an inlet port 111 is positioned in the inlet side spatial compartment 121 and an outlet port 113 is positioned at a boundary between the outlet side spatial compartment 122 and the inlet side spatial compartment 121. Additionally, the control circuit board 103 is disposed directly above the inlet port 111 of the blower 110.

An ellipsoidal reflector whose top and bottom are cut off into a plane, the light source unit 63 which has the discharge lamp using halogen and incorporated in an interior of the reflector, a primary reflecting mirror 67 which changes the direction of an optical axis of light emitted from the light source 63, a color wheel 68 which has red, green and blue color filters and which is driven by a wheel motor and a discharged air temperature reducing unit 114 which is made up of cooling fins and heat pipes are disposed within the outlet side spatial compartment 122.

In addition, this outlet side spatial compartment 122 is formed so as to have a front space which has a length extending from a position lying in the vicinity of the right-hand panel 14 to a position lying really close to the lens cover 19 along the front panel 12. Then, highly heated air which has just cooled the light source 63 is dispersed over a wide range via the discharged air temperature reducing unit 114 disposed along the front panel 12 within the outlet side spatial compartment 122 and is then discharged to the outside of the projector casing.

Figure 4:
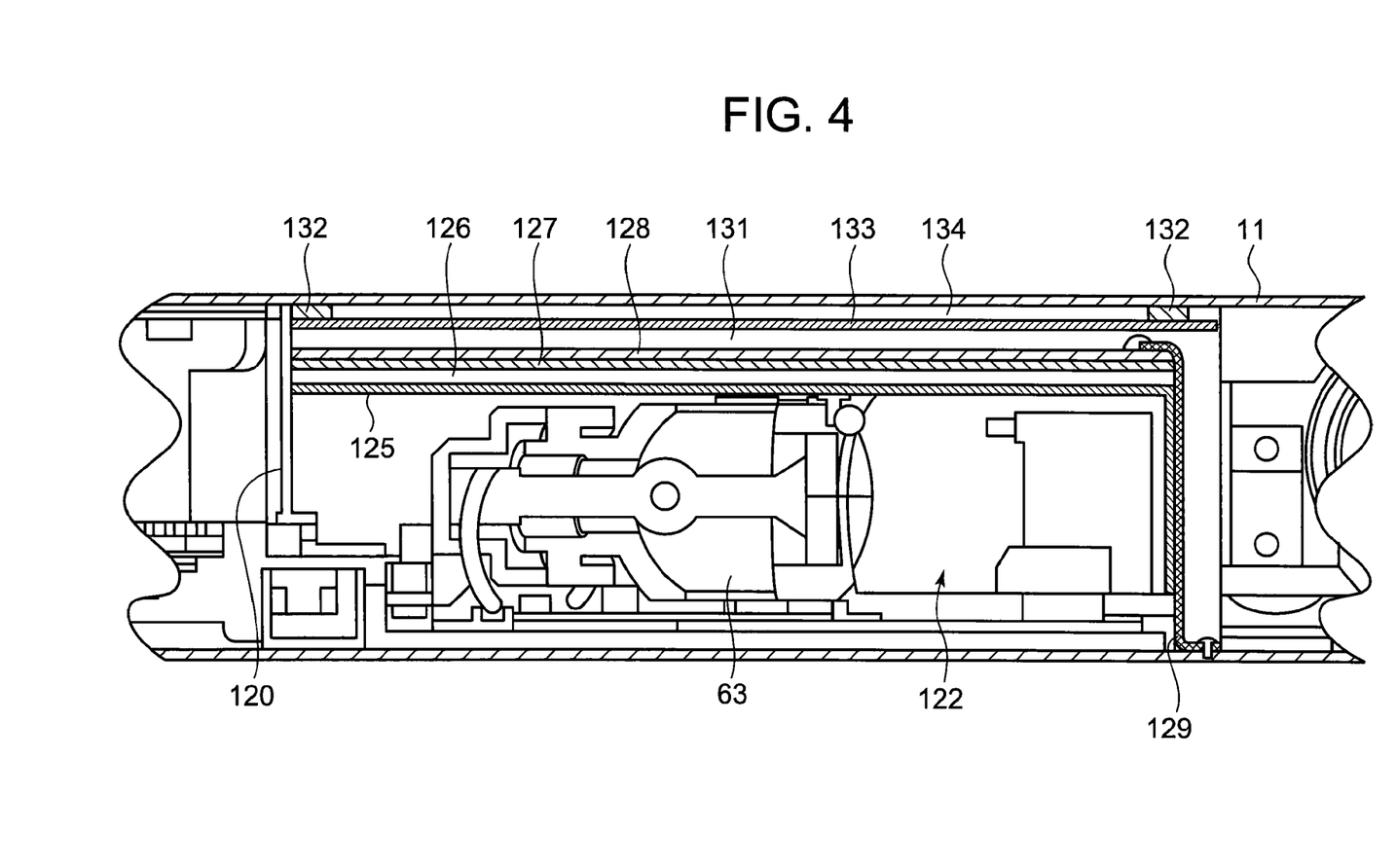
FIG. 4 is a partially enlarged sectional view of the projector according to the embodiment of the invention.

The projector 10 includes a heat insulating construction which prevents heat of the light source unit 63 disposed within the outlet side spatial compartment 122 from being conducted to the upper panel 11 to thereby heat the upper panel 11 to a high temperature. As is shown in FIG. 4, this heat insulating construction is made up of an upper division board 125 which has heat insulating properties and heat resisting properties and makes up an upper surface of the outlet side spatial compartment 122, a resin board 127 which is disposed above the upper division board 125 via a laminar air discharging space 126 and a heat conductive sheet 128 disposed on an upper surface of the resin board 127, a heat resistant sheet 133 which is disposed in a position lying below an inner surface of the upper panel 11 and above the outlet side spatial compartment 122 via spacers 132, a laminar heat insulating space 134 defined between the upper panel 11 and the heat resistant sheet 133 by the spacers 132, and a laminar heat dissipating space 131 defined between the heat conductive sheet 128 and the heat resistant sheet 133.

The resin board 127 is formed of a rigid resin material or the like and is formed into a shape which is substantially the same as that of the upper division board 125 of the outlet side spatial compartment 122. In addition, this resin board 127 is disposed in such a manner as to define the laminar air discharging space 126 which configures a predetermined space above the upper division board 125.

In addition, the heat conductive sheet 128 is formed of a highly conductive metallic sheet such as an aluminum sheet and is affixed to the upper surface of the resin board 127. Then, a lead wire 129 is drawn out from a predetermined position lying in the vicinity of a ridge, and this lead wire 129 is connected to, for example, a bottom surface of the projector casing which has electricity conducting properties. Further, the heat conductive sheet 128 is formed into a shape which is substantially the same as that of the resin board 127, so as to cover the whole of an upper surface of the outlet side spatial compartment 122. In addition, since this heat conductive sheet 128 is electrically connected to the projector casing via the lead wire 129, charged electricity can be discharged to the projector casing, and therefore, there is no such case that the heat conductive sheet 128 is kept charged. Consequently, the generation of noise in a projected image can be prevented which would otherwise be caused to occur by the heat conductive sheet 128 being charged. In addition, the lead wire 129 may be formed by extending part of the aluminum sheet which configures the heat conductive sheet 128 or may be formed separately of an electricity conductive material. Additionally, since the heat conductive sheet 128 covers the whole of the upper surface of the outlet side spatial compartment 122, the heat dispersing effect can also be increased.

Note that the invention is not limited to the aforesaid case where the heat conductive sheet 128 covers entirely the upper surface of the outlet side spatial compartment 122, and hence, the heat conductive sheet 128 may be sized in such a manner as to cover an area of the upper surface of the outlet side spatial compartment 122 which is half or more than half the whole of the upper surface and which lies above the light source unit 63 shown in FIG. 3, whereby heat conducted to a portion of the resin board 127 which lies directly above the light source unit 63 can be dispersed over such a wide range.

Further, the laminar air discharging space 126 defined between the resin board 127 and the upper division board 125 prevents the direct conduction of heat of the upper division board 125 to the heat conductive sheet 128 via the resin board 127. An opening is formed in the upper division board 125, so that discharged air is made to flow from the outlet side spatial compartment 122 into the air discharging space 126 through this opening. Then, the discharged air which has flowed into the air discharging space 126 flows between the upper division board 125 and the resin board 127 so as to flow into the discharged air temperature reducing unit 114 which is disposed in the vicinity of the front panel 12 to thereby be cooled by the discharged air temperature reducing unit 114 and is thereafter discharged to the outside through the outlet slits 17 formed in the front panel 12 shown in FIG. 1.

Additionally, the heat resistant sheet 133 which is disposed on the upper panel 11 via the spacers 132 are formed of a resin sheet with high heat insulating properties. Thus the heat in the outlet side spatial compartment 122 which is dispersed by heat conductive sheet 128 can be prevented from conducting to the upper panel 11 directly. Further, the spacers 132 are formed of a heat-resistant pressure sensitive adhesive double coated tape and define the heat insulating space 134 between the heat resistant sheet 133 and the upper panel 11. Then by affixing the heat resistant sheet 133 onto the upper panel 11 via the spacers 132, the heat insulating space 134 is defined between the heat resistant sheet 133 and the upper panel 11. Even if the heat resistant sheet 133 is heated, the heat insulating space 134 can prevent the heat of the heat resistant sheet 133 from being conducted to the upper panel 11 directly.

In addition, the heat dissipating space 131 defined between the heat conductive sheet 128 and the heat resistant sheet 133 is a space which is formed to make it difficult for heat dispersed by the heat conductive sheet 128 to be conducted to the heat resistant sheet 133. By the heat dissipating space 131 being so defined, the heat insulating effect can be increased further than in a case where the heat conductive sheet 128 and the heat resistant sheet 133 are disposed to lie close to each other.

Additionally, as is shown in FIG. 3, an optical system unit 65 is made up of three blocks including an illumination side block which is positioned in the vicinity of the light source unit 63, an image generation block which includes the display device 51, and a projection side block which includes a projection side optical system 90 and is disposed along the left-hand panel 15.

The illumination side block includes part of a light source side optical system which guides light which is emitted from the light source unit 63 and is colored by a color wheel 68 to the display device 51 included in the image generation block. As those making up the light source side optical system possessed by the illumination side block, there are a light guiding unit 75 such as a light tunnel which makes light which passes through filters of the color wheel 68 into a pencil of light whose intensity distribution is uniform or a light guiding or smoothing rod, and a condenser lens which makes a pencil of light emitted from the light guiding unit 75 converge.

Additionally, as is shown in FIG. 3, the image generation block has a secondary reflecting mirror 70 which changes the direction of light emerging from the light tunnel 71, a light source side lens group 83 which is made up of a plurality of lens elements for making light reflected by the secondary reflecting mirror 70 converge to the display device 51, and a light shining mirror 84 which shines light that has passed through the light source side lens group 83 on to the display device 51 at a predetermined angle as the light source side optical system. Further, the image generation block includes a DMD (Digital Micromirror Device) which configures the display device 51. Note that a display device cooling unit 53 for cooling the display device 51 is disposed on a back panel 13 side of the display device 51, so as to prevent the display device 51 being heated to a high temperature.

The projection side block has a lens group of the projection side optical system 90 for emitting light which is reflected by the display device 51 to form an image on to a screen. This projection side optical system 90 is a variable focus lens which includes a zooming function and includes a fixed lens group 93 which is incorporated within a fixed lens barrel and a movable lens group 97 which is incorporated within a movable lens barrel. Namely, the projection side block enables zooming and focusing by moving the movable lens group 97 by a lens motor.

According to the projector 10 of the embodiment, as the heat insulating construction of the upper panel 11, the heat conductive sheet 128 is disposed above the upper division board 125 and the heat conductive sheet 128 is attached to the projector casing with screws via the highly electricity conductive metal, so that electricity flowing to the heat conductive sheet 128 can be discharged to the projector casing. By this configuration, the heat conductive sheet 128 can be prevented from being charged like a capacitor, thereby making it possible to prevent the generation of noise in an image which would otherwise be caused to occur by the conductive sheet 128 being charged. Further, since the heat conductive sheet 128 can be disposed in such a manner as to lie close to a circuit board or the like, the place where the heat conductive sheet 128 is disposed can freely be changed, thereby making it possible to increase the degree of freedom in design change when designing the projector 10. Furthermore, since the heat conductive sheet 128 is not charged, the surface area of the heat conductive sheet 128 can be expanded over such a wide range as the whole surface or half or more than half the whole surface of the upper division board 125 which makes up the upper surface of the outlet side spatial compartment 122, so as to increase the heat dissipating effect, thereby making it possible to prevent part of the projector casing from being heated locally.

In addition, the heat dispersing effect can be increased by forming the heat conductive sheet 128 of a thin metallic sheet having high heat conductivity such as aluminum sheet. Further, in this projector 10, the resin board 127 is disposed between the upper division board 125 and the heat conductive sheet 128, and the heat conductive sheet 128 is affixed to the resin board 127. As a result, since the heat conductive sheet 128 can be disposed under tension, there is no such situation that heat concentration occurs in a bent portion in the heat conductive sheet 128, thereby making it possible to dissipate heat uniformly from the whole surface thereof.

Additionally, in this projector 10, since there is no such situation that heat in the upper division board 125 is conducted directly to the heat conductive sheet 128 by the air discharging space 126 being defined therebetween, the quantity of heat that is conducted to the upper panel 11 is reduced, thereby making it possible to increase the heat insulating effect.

In addition, in the projector 10, the heat dispersed and dissipated by the heat conductive sheet 128 can be prevented from being conducted to the upper panel 11 by disposing the heat resistant sheet 133 in the position lying below the inner surface of the upper panel 11 and above the outlet side spatial compartment 122. Additionally, by the heat insulating space 134 being defined between the heat resistant sheet 133 and the upper panel 11 by disposing the spacers 132 between the heat resistant sheet 133 and the upper panel 11, even though the heat resistant sheet 133 is heated, the upper panel 11 can be prevented from being heated.

Further, by the spacers 132 being formed of a heat resistant pressure sensitive adhesive double coated tape, not only can the heat resistant sheet 133 be bonded and held, but also heat in the heat resistant sheet 133 can be prevented from being conducted to the upper panel 11 via the spacers 132.

In addition, while in order to prevent the conduction of heat generated in the outlet side spatial compartment 122 to the upper panel 11 of the projector casing, the configuration is adopted in which the heat resistant sheet 133 and the spacers 132 are disposed on the inner surface of the upper panel 11 in the way described above so as to define the heat insulating space 134, the invention is not limited thereto. For example, a configuration may be adopted in which for example, a material having heat insulating properties and heat resisting properties is simply disposed on the inner surface of the upper panel 11 of the projector housing. In either case, the construction only has to be realized which exhibits the heat insulating effect which prevents the conduction of heat generated in the outlet side spatial compartment 122 to the upper panel 11 of the projector housing.

In addition, in the projector 10, the heat dissipating space 131 is defined between the heat conductive sheet 128 which is disposed above the upper division board 125 and the heat resistant sheet 133 which is disposed on or below the inner surface of the upper panel 11. By this configuration, since heat dispersed and dissipated from the heat conductive sheet 128 is cooled to be conducted to the heat resistant sheet 133, the quantity of heat that is to be conducted to the heat resistant sheet 133 is reduced, thereby making it possible to increase further the heat insulating effect of the upper panel 11.

Note that in the embodiment, while the aluminum sheet is used as the heat conductive sheet 128, any material can be used as long as it has high heat conducting properties. Additionally, in the embodiment, while the sheet having high heat insulating properties is described as being used as the heat resistant sheet 133, even a material having good heat conducting properties can be used as long as it has heat resisting properties since heated discharged air can be cooled in the heat insulating space 134. In addition, while the heat resistant pressure sensitive adhesive double coated tape is used as the spacers 132, any other material can be used as long as it has high heat insulating properties. Further, the invention is not limited to the embodiment and modifications thereto but can be modified and/or improved freely without departing from the spirit and scope of the invention.

While the invention has been described based upon the various typical embodiments illustrated above, the invention is not limited thereto. Consequently, the scope of the invention is only limited by the scope of claims which will be described below.

FIG. 2
- 21 input/output connector part
- 22 input/output interface
- 23 image transforming part
- 24 display encoder
- 25 video RAM
- 26 display driving part
- 31 image compression/expansion part
- 32 memory card
- 35 Ir receiving part
- 36 Ir processing part
- 37 key/indicator part
- 38 control unit
- 41 power supply control circuit
- 43 cooling fan driving control circuit
- 47 sound processing part

What is claimed is:

1. A projector comprising a light source unit and a light source compartment which accommodates the light source unit, wherein:
    the light source compartment is covered thereabove by an upper division board;
    a heat conductive sheet is disposed above the upper division board via an air discharging space which is capable of discharging air discharged from the light source compartment to outside of a projector casing;
    a heat dissipating space is formed above the heat conductive sheet, between the heat conductive sheet and a panel which forms an upper surface of the projector casing; and
    the heat conductive sheet is electrically connected to the projector casing.

2. The projector according to claim 1, further comprising a light source side optical system, a display device, and a projection side optical system.

3. The projector according to claim 1, further comprising a cooling unit.

4. The projector according to claim 3, wherein an interior of the projector casing is divided into (i) the light source compartment which is positioned on an outlet side of the cooling unit, and (ii) an inlet side spatial compartment which is positioned on an inlet side of the cooling unit.

5. The projector according to claim 1, wherein the heat conductive sheet is disposed such that a part of the heat conductive sheet is grounded to an electrically conductive portion of a bottom surface of the projector casing via at least one point thereof.

6. The projector according to claim 1, wherein the heat conductive sheet comprises a thin metallic board and covers at least half of the upper division board.

7. The projector according to claim 1, wherein the heat conductive sheet comprises an aluminum sheet.

8. The projector according to claim 1, wherein:
    a resin board having rigidity is disposed between the upper division board and the heat conductive sheet, and
    the heat conductive sheet is affixed to the resin board.

9. The projector according to claim 8, wherein:
    an air discharging space is defined between the upper division board and the resin board, and
    an opening is formed in the upper division board for causing discharged air to flow into the air discharging space.

10. The projector according to claim 1, wherein:
    the projector housing has a substantially rectangular parallelepiped shape, and
    a heat resistant sheet is disposed in a position lying on an inner surface side of a panel which forms an upper surface of the projector casing, above the light source compartment.

11. The projector according to claim 10, wherein spacers are disposed between the heat resistant sheet and the panel which forms the upper surface of the projector casing to thereby define a heat insulating space therebetween.

12. The projector according to claim 11, wherein the spacers comprise a heat resistant pressure sensitive adhesive double coated tape.

13. The projector according to claim 10, wherein a heat dissipating space is defined between the heat conductive sheet which is disposed above the upper division board and the heat resistant sheet which is disposed on the inner surface side of the panel which forms the upper surface of the projector casing.

* * * * *